United States Patent [19]
Larsen et al.

[11] Patent Number: 6,050,179
[45] Date of Patent: Apr. 18, 2000

[54] STRAINER DEVICE FOR DRAINING OFF WHEY FROM A CHEESE VAT

[75] Inventors: Stig C. Larsen, Ikast; Per Busk, Silkeborg, both of Denmark

[73] Assignee: APV Pasilac A/S, Aarhus C, Denmark

[21] Appl. No.: 09/194,342

[22] PCT Filed: Jun. 4, 1997

[86] PCT No.: PCT/DK97/00249

§ 371 Date: Nov. 24, 1998

§ 102(e) Date: Nov. 24, 1998

[87] PCT Pub. No.: WO97/46081

PCT Pub. Date: Dec. 11, 1997

[30] Foreign Application Priority Data

Jun. 4, 1996 [DK] Denmark ................................. 0629/96

[51] Int. Cl.$^7$ ...................................................... A01J 25/06
[52] U.S. Cl. ................... 99/459; 99/465; 99/458
[58] Field of Search ............................ 99/456, 458, 459, 99/460, 465, 466; 210/380.3, 374

[56] References Cited

U.S. PATENT DOCUMENTS

| 130,862 | 8/1872 | Pease . | |
|---|---|---|---|
| 3,032,877 | 5/1962 | Collins | 99/466 |
| 3,858,855 | 1/1975 | Hazen | 99/462 |
| 4,509,413 | 4/1985 | Granberg et al. | 99/453 |

FOREIGN PATENT DOCUMENTS 146311  2/1984  Denmark .

*Primary Examiner*—Reginald L. Alexander
*Attorney, Agent, or Firm*—McDermott, Will & Emery

[57] ABSTRACT

A strainer device for draining off whey from a cheese vat comprises an outlet for the whey and a substantially circularly shaped strainer disc (3) arranged in the outlet. This strainer disc is rotatably arranged in the wall (2) of the cheese vat about an axis of rotation (7) extending perpendicular to said wall and being connected to a motor for rotating the strainer disc.

7 Claims, 1 Drawing Sheet

U.S. Patent
Apr. 18, 2000
6,050,179
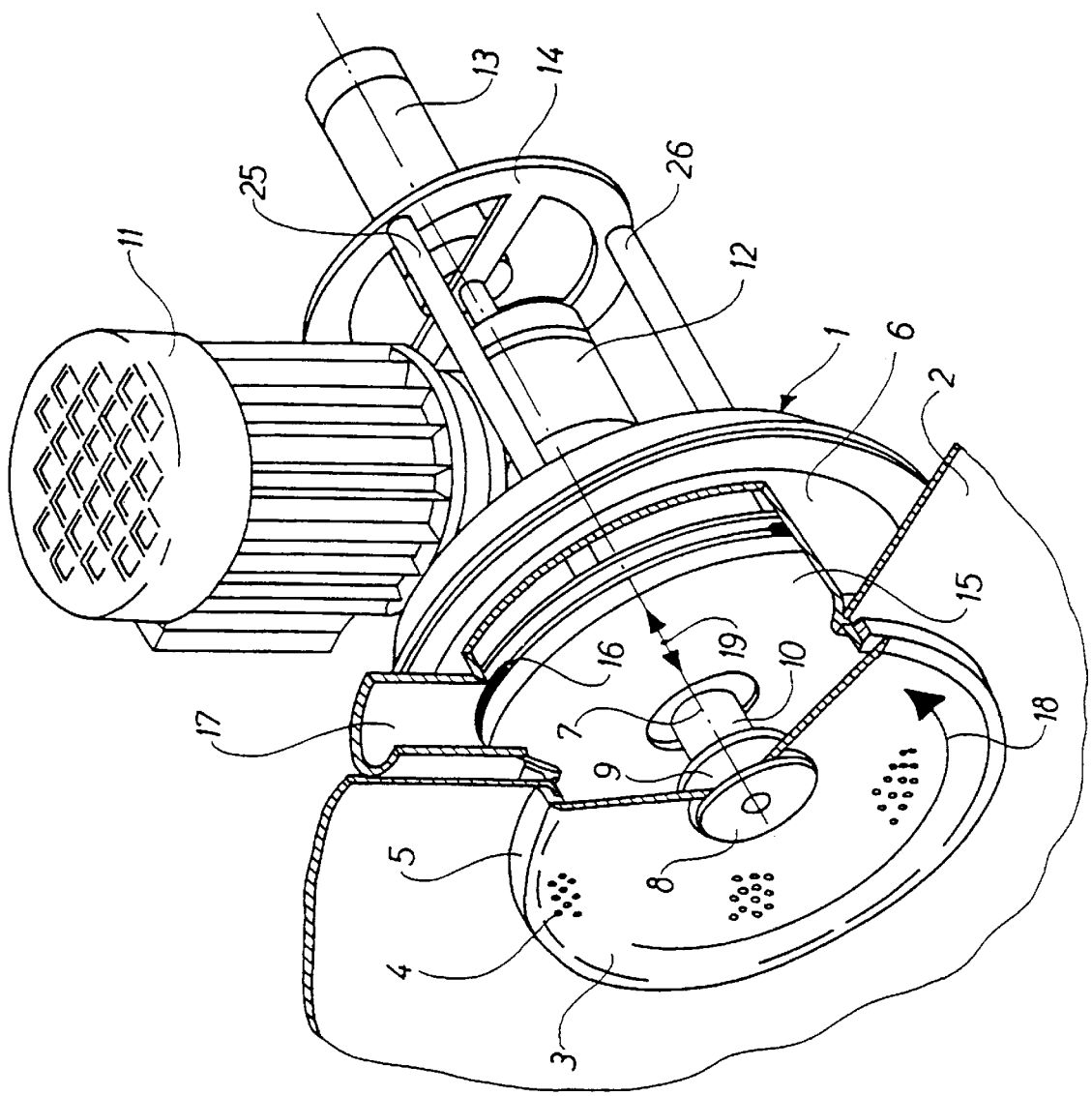

STRAINER DEVICE FOR DRAINING OFF WHEY FROM A CHEESE VAT

TECHNICAL FIELD

The invention relates to a strainer device for draining off whey from a cheese vat, and which comprises an outlet for the whey and a strainer arranged in said outlet.

BACKGROUND ART

The preparation of cheese mass for soft, semi-hard and hard types of cheese is mainly performed in closed cheese vats. Both vertical and horizontal cheese vats exist, and both types are equipped with stirring and cutting means allowing a treatment of the cheese milk during the preparation of the cheese mass. For instance DK-PS No. 146,311 discloses a cheese vat of the vertical type. In use, this cheese vat is filled with milk being caused to coagulate by means of enzyme and acid, acid alone or a composite coagulant. The curd is then cut into small pieces, preferably small cubes by rotatably arranged frames carrying sets of stirring and cutting means which are caused to rotate in a first direction of rotation. As a result, the whey is easily separated from the cheese mass and drained off. After the cutting, the curd is subjected to a stirring by the frame being rotated in the opposite direction of rotation, optionally while the curd is simultaneously heated during the entire or some of the stirring period. As a result, additional whey is separated from the cheese mass, said cheese mass simultaneously turning harder.

The various types of cheese require their respective production procedures. After the heating, the stirring and the addition of for instance rennet, the milk is allowed to stay for instance for approximately 30 minutes. During the latter period, the cheese milk coagulates, whereafter the cutting means are started and the curd is cut into curd pieces over a cutting period of typically 5 to 10 minutes. Then the stirring is started, and after a stirring for approximately 10 minutes the stirring means are stopped and the curd pieces sediment in the whey. The curd particle to whey ratio is approximately 1 part of curd particles to 9 parts of whey. The sedimenting period depends on the fat content in the curd pieces, but it lasts typically 30 to 100 seconds.

Subsequently a first draining off of whey is initiated. This draining off is according to the prior art performed either by means of a suction pipe with a strainer being lowered into the whey, or by means of a valve being opened into a permanent tube arranged in the side of the cheese vat at a level at which the whey is to be drained off. The draining off of whey must be performed as quickly as possible and typically within 3 to 6 minutes, and during this period 20 to 30% of the whey is drained off. After the draining off of whey, a cutting of the sedimented curd pieces is performed for 30 to 60 seconds, said curd pieces prior to the cutting being coherent while forming a large lump. When the cutting has been terminated, the stirring is started again, and this stirring is typically performed simultaneously with the heating or the addition of hot process water. When the stirring has been terminated after approximately 10 minutes, the stirring means are stopped and the curd pieces are allowed to sediment. After termination of this sedimenting period, the second draining off of whey can be started. The second draining off is performed in the same manner as the first draining off, and typically the same amount of whey is drained off as well. Then yet another brief cutting is performed of the curd pieces for 30 to 60 seconds. The resulting cheese mass is subjected to a stirring, and the final emptying thereof is started simultaneously with said stirring.

Especially in connection with low-fat cheese, a high risk applies of formation of lumps in the cheese vat after the second draining off of whey. These lumps must be removed manually after the emptying of the vat. The resulting yield and the corresponding loss vary in response to the type of vat. The highest loss is found in curd fines which are very small curd particles leaving the vat together with the whey, and which result from the cutting and stirring means. Especially after the draining off of whey has been terminated and the cutting has been started followed by the stirring, the curd fines appear, and these fines could have been avoided by the draining off of whey being performed simultaneously with the stirring. It would also be possible to extend the draining off period to approximately 20 minutes, whereby the formation of lumps would be prevented too.

Almost all suppliers of cheese vats have tried to develop a continuous draining off system for whey. No system has been developed so far which can be used within the industry. The problems involved are for instance that the strainer associated with the outlet is clogged by curd particles, or that so many additional curd fines apply that the yield is too low. Another problem is found in the fact that the draining off of whey from the cheese vat may take too long.

BRIEF DESCRIPTION OF THE INVENTION

Accordingly the object of the invention is to provide a strainer device to be used in connection with the draining off of whey from a cheese vat, and which allows said draining off to be performed simultaneously with the rotation of the stirring and cutting means.

The strainer device according to the invention is characterised in that the strainer is a substantially circularly shaped strainer disc which is rotatably arranged in the wall of the cheese vat about an axis of rotation perpendicular to said wall, and that the strainer disc is connected to a motor for rotating said strainer disc. The rotational speed of the rotatable strainer disc can be varied in such a manner that optimum conditions can be provided in response to the type of cheese mass in question. The hardness of the curd pieces depends on the fat content, and a low fat content results in heavy and hard curd particles, and a high fat content results in light and rather loosely bound curd particles. The rotating strainer disc ensures the necessary flow in such a manner that the curd particles do not stick permanently onto said strainer disc, but are loosened as a consequence of the rotating movement. In order to additionally ensure a constantly clean strainer disc, the draining off of whey can be stopped at predetermined long or short intervals. As a result, the strainer disc is flushed so as to remove possible curd pieces adhering thereto due to the stirring means passing closely by the surface of said strainer disc during the stirring procedure.

The strainer disc may particularly advantageously be mounted on a centrally arranged shaft drivably connected to the motor.

While milk is filled in and up to the first draining off of whey, it must be possible to block and seal the strainer device in such a manner that none of the content of the vat passes into said strainer device behind said strainer disc. The latter is according to the invention obtained by the strainer disc being arranged at the end of a cylindrical housing, which includes a displaceably arranged piston for sealingly closing the flowing out of whey through the strainer disc when said piston is positioned in an advanced position abutting said strainer disc. When the draining off of whey is started, the piston is removed from the strainer disc in such a manner that passage is allowed therethrough into the interior of the cylindrical housing.

According to the invention, the piston may be driven by means of a driving motor through a number of piston rods projecting into the cylindrical housing, said piston rods being arranged around the axis of rotation of the strainer disc and being fixedly interconnected outside the cylindrical housing. The resulting control of the piston is very efficient.

According to the invention, the strainer device may be placed at a level inside the cheese vat which is always below the surface of the whey, whereby it is ensured that the cheese mass does not come into contact with air.

According to the invention it is particularly preferred that an outlet tube is connected to the uppermost area of the housing for the further transport of the whey therefrom in such a manner that it is possible to empty said outlet tube without emptying the cylindrical housing. As a result it is additionally ensured that air does not pass into the cheese mass. Before the piston is retracted, care must be taken that the cylindrical housing is filled with fluid.

Finally, the piston may according to the invention be adapted to reciprocate at a suitable frequency in use with the effect that a pulsating flow is produced on the rear side of the rotating strainer disc, said pulsating flow assisting in pushing the curd pieces away from said strainer disc.

BRIEF DESCRIPTION OF THE DRAWING

The invention is explained in greater detail below with reference to the accompanying drawing, which is a diagrammatic perspective view of a preferred embodiment of the invention, whereby parts have been cut off for the sake of clarity, said embodiment being mounted in the side of a cheese vat of which only a portion appears.

BEST MODE FOR CARRYING OUT THE INVENTION

The strainer device shown in the drawing is designated the general reference numeral 1 and is mounted in a side wall 2 of a cheese vat. The strainer device comprises a rotatable strainer disc 3 provided with a suitable number of perforations 4. Relative to the side wall 2, the strainer disc is placed on the inner side thereof by engaging a flange 5 along the periphery. The flange 5 is fixedly connected to the side wall of the cheese vat and sealingly fills out the space between the periphery of the strainer disc 3 and the inner side of the side wall 2. The flange 5 is sealingly connected to a cylindrical housing 6 which on the outer side of the side wall 2 of the cheese vat extends away therefrom coaxially to the axis of rotation 7 of the strainer disc 3. The strainer disc 3 forms the bottom of the cylindrical housing 6, which besides is closed at the opposite end.

The strainer disc 3 is secured to a driving shaft 10 by means of two washers 8 and 9. The driving shaft extends coaxially through the cylindrical housing 6 and is connected to a driving motor 11 through a gear box 12 outside said housing. A pneumatic cylinder 13 is secured to the side of the gear box 12, said side opposing the cylindrical housing 6. This pneumatic cylinder 13 is operationally connected to a driving flange 14 which extends perpendicular to the axis of rotation 7 of the strainer disc 3. The driving flange 14 is adapted to reciprocate along the axis of rotation 7 by means of the pneumatic cylinder 13. The driving flange 14 is fixedly connected to a number of piston rods 25, 26 extending into the interior of the cylindrical housing 6 parallel to the axis of rotation 7 and uniformly distributed thereabout.

Inside the cylindrical housing 6, the piston rods 25 and 26 are fixedly connected to a piston 15 which carries a sealing ring 16 along the circumference. The piston 15 is adapted to be forwardly displaced into a sealing abutment against the inner side of the strainer disc 3 by means of the pneumatic cylinder 13 so as to block for passage of fluid into the interior of the housing 6 through the perforations 4 of the strainer disc 3 inside the cheese vat.

An outlet tube 17 is connected to an uppermost portion of the cylindrical housing 6 for the transport of fluid away from said cylindrical housing 6.

The use of the strainer device 1 allows a draining off of fluid from the cheese vat according to desire. Until the time where fluid is to be drained off, the piston 15 is retained in a sealing abutment against the strainer disc 1. When a draining off of fluid is desired from the cheese vat, the piston 15 is pulled away from the strainer disc and into an area behind the opening of the outlet tube 17 within the cylindrical housing 6 while the strainer disc 3 is simultaneously caused to rotate, cf. the arrow 18. If desired, the piston 15 can be caused to reciprocate at a suitable frequency in said retracted position far away from the strainer disc 3, cf. the double arrow 19.

When it is desired to interrupt the draining off of fluid from the cheese vat, the piston 15 is again pushed forward into abutment against the strainer disc 3 at the same time as the rotation of the latter is stopped.

The invention has been described with reference to a preferred embodiment. Many modifications can be carried out without thereby deviating from the scope of the invention.

What is claimed is:

1. A strainer device for draining off whey from a cheese vat, wherein the strainer device comprises an outlet for the whey and a strainer arranged in the outlet, characterised in that the strainer is a substantially circularly shaped strainer disc, which is rotatably arranged in a wall of the cheese vat about an axis of rotation extending perpendicular to said wall, and that the strainer disc is connected to a motor for rotating said strainer disc.

2. A strainer device as claimed in claim 1, characterised in that the strainer disc is mounted on a centrally arranged shaft which is drivably connected to a motor.

3. A strainer device as claimed in claim 1, characterised in that the strainer disc is arranged at the end of a cylindrical housing, which includes a displaceably arranged piston for sealingly closing the flowing out of whey through the strainer disc when it is in an advanced position abutting said strainer disc.

4. A strainer device as claimed in claim 3, characterised in that the piston is driven by means of a driving motor through a number of piston rods projecting into the cylindrical housing, said piston rods being arranged around the axis of rotation of the strainer disc and being fixedly interconnected outside the cylindrical housing.

5. A strainer device as claimed in claim 1, characterised in that it is placed at a level inside the cheese vat which is always below the surface of the whey.

6. A strainer device as claimed in claim 3, characterised in that an outlet tube is connected to the uppermost area of the cylindrical housing for the further transport of the whey therefrom.

7. A strainer device as claimed in claim 3, characterised in that the piston is adapted to reciprocate at a suitable frequency in use.

* * * * *